Patented Feb. 11, 1936

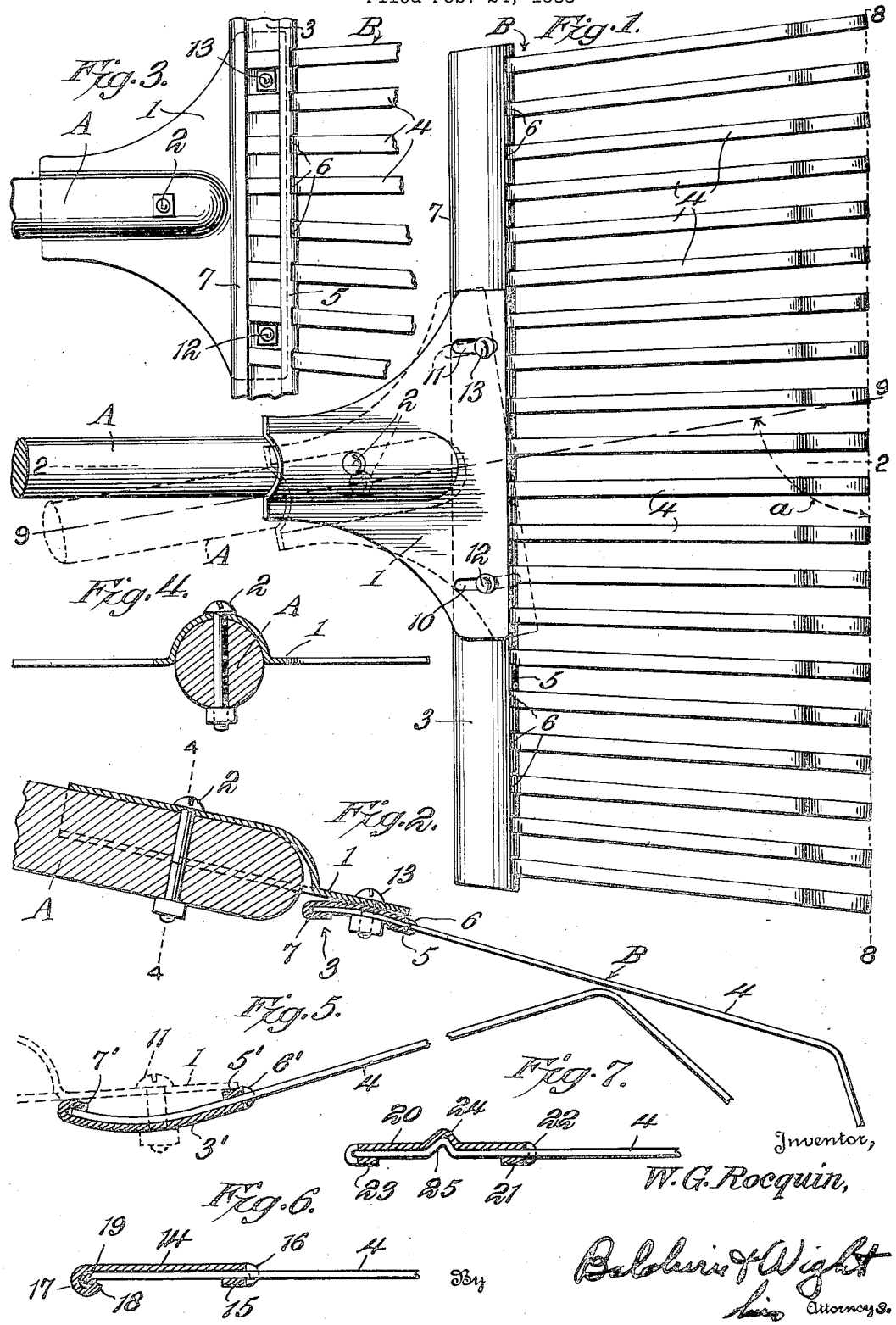

2,030,183

UNITED STATES PATENT OFFICE 2,030,183

RAKE

Wenceslaus G. Rocquin, New Orleans, La., assignor to Valley Manufacturing Corporation, a corporation of Louisiana Application February 24, 1933, Serial No. 658,392

8 Claims. (Cl. 55—114)

This invention relates to rakes and more particularly to spring toothed lawn rakes of the kind including a relatively rigid frame and a plurality of relatively flexible teeth or tines connected to the frame.

Rakes of this general character often are used for gathering cut grass, leaves, and other light material and frequently it is desirable to employ a sweeping side stroke similar to a broom stroke, as distinguished from the straight "draw stroke" used with heavier types of ground working rakes. Difficulty has been encountered in using a sweeping or side stroke with most spring-toothed lawn rakes heretofore known because when the rake handle is disposed at an angle, as it must be when such a stroke is used, the ground-engaging ends of the tines lie in a line disposed at an angle to the ground, so that only a relatively small part of the tines are employed usefully.

Heretofore, it has been proposed to provide a spring-toothed lawn rake with a swivel connection between the handle and rake proper so as to permit the rake tines to be set in various angular positions relative to the handle by means of which a sweeping side stroke with all the tines engaging the ground may be used. An example of a rake of this character is that disclosed in Patent No. 1,772,571, issued April 12, 1930, to W. Withington.

An object of the present invention is to provide a spring-toothed lawn rake including connections between the handle and rake proper permitting angular adjustments of the latter relative to the handle and at the same time providing an improved and more rigid assembly than the prior art.

A further object is to provide in a rake of the character described an improved frame and tine assembly. Other objects will become apparent from a reading of the following description, the appended claims, and the accompanying drawing, in which:

Figure 1 is a top plan view of a rake embodying the invention;

Figure 2 is a longitudinal sectional view taken on the line 2—2 of Figure 1;

Figure 3 is a fragmentary bottom plan view of the rake shown in Figure 1;

Figure 4 is a sectional view taken on the line 4—4 of Figure 2;

Figure 5 is a vertical sectional view of a modification;

Figure 6 is a vertical sectional view of an additional modification; and

Figure 7 is a vertical sectional view of a further modification.

Referring to the embodiment of the invention illustrated in Figures 1 to 4 inclusive, there is shown a rake including a handle A, and a rake proper B connected to an attaching plate 1, the latter being secured to the handle A by means of a bolt 2.

The rake proper includes a frame member 3 extending substantially transversely of the handle and a plurality of spaced flexible tines 4 connected to the frame 3. The frame member 3 is deformed in cross section as shown in Figure 2, in this embodiment of the invention the deformation consisting in the frame member's being curved upwardly toward the center between its front and rear edges. The front edge portion 5 of the frame member is bent over and preferably is return-bent and is formed with a plurality of spaced tine-receiving openings 6 through which the tines pass, the rear ends of the tines lying under a return-bent rear edge portion 7 of the frame 3. The portions of the tines intervening between the edges 5 and 7 of the frame are deformed, i. e., curved so as to conform to the deformation or curvature of the frame member whereby the tines will contact with the frame member between its front and rear edges. If a tine has become bent or broken, so that it is desired to remove it and to replace it with a new one, the removal may be effected easily by bending the tine upwardly (as viewed in Figure 2) whereby the portion of the tine intervening between the edges 5 and 7 will be sprung away from the frame member, thus permitting withdrawal of the tine through the associated opening 6. It will be apparent that the above described tine and frame assembly is of simple and inexpensive construction in which the tines are securely held in place during use, yet permitting easy removal of one or more tines when necessary.

In accordance with a further feature of the invention, the mounting of the tines relative to the handle A, such that the ground-engaging ends of the tines lie in a line 8—8 which extends at an acute angle $a$ to the axis 9—9 of the handle A so as to assure engagement of all the tines with the ground when a sweeping side stroke is used. Inasmuch as the tines should be inclined relative to the handle in one direction when used by a right-handed person and in the other direction when used by a left-handed person, and also in view of the fact that it is desirable that the tines be set at a greater or lesser angle relative to the handle when the ground is raked relatively remote from or close to the user, it is preferable that the rake proper be mounted for swivelling movements with respect to the handle in order that the tines may be adjusted relative to the handle. In the embodiment of the invention shown by way of example, this adjustment is made possible through the provision of slots 10 and 11 in the attaching plate 1 and bolts 12 and 13 which pass through the slots 10 and 11 respectively and engage the frame member 3 for clamping the latter against the attaching plate 1 in adjusted angular positions with the frame member and attaching plate in contact throughout substantially the entire width of the latter, whereby a rigid connection is provided. Where a slight adjustment is desired, it may be necessary only to loosen one of the screws 12—13 and to swing the frame and tines about the other screw as a pivot, after which the loosened screw is tightened, thereby securing the frame to the handle in the desired angular position.

Figure 5 illustrates a modified form of frame and tine assembly. This frame is similar to that shown in Figures 1 to 4 inclusive with the exception that the frame member 3' is curved downwardly rather than upwardly, as in the first form. In the form shown in Figure 5, in order to remove a tine, the latter is bent downwardly about the front edge of the frame member, whereby the tine portion intervening between the edges 5' and 7' of the frame is sprung upwardly, permitting removal of the tine through the opening 6'. This form possesses the advantage of a somewhat tighter connection between the tines and the frame when the rake is used, inasmuch as when in use the tines normally are pressed upwardly, whereby the rear portions of the tines are forced downwardly into tight engagement with the frame member.

In the modification shown in Figure 6, the frame member 14 is substantially straight between its front and rear edges 15 and 17, the tines passing through spaced openings 16 as in the forms described above. For securing the tines in place, the extreme rear edge portion of the frame is turned inwardly and upwardly so as to form a groove and to lie in front of the downwardly turned rear ends or projections 19 of the tines, whereby longitudinal movement of the tines relative to the frame is resisted. If it is necessary to remove a tine the extreme rear edge portion 18 of the frame adjacent that tine may be sprung away from the tine by means of a screw driver so as to permit the tine to be withdrawn through the opening 16, after which a new tine is inserted and the frame edge portion 18 pressed downwardly to lie in front of the rear end 19 of the tine.

In the modification shown in Figure 7, the frame member 20 has its front edge portion 21 return-bent and formed with openings 22 through which the tines 4 pass, the rear edge portion 23 of the frame being return-bent to fit under the rear ends of the tines. Intermediate its front and rear edges, the frame is struck up to provide a groove 24 which receives struck-up portions or projections 25 on the tines, the groove 24 cooperating with the struck-up portions 25 on the tines to hold the latter against longitudinal movement.

In the construction shown, the tines and frame member are cooperatively deformed in such manner as to resist accidental displacement of the tines from the frame. More specifically, in the forms shown in Figures 6 and 7, the tines have interlocking connection with the frame member whereby longitudinal displacement of the tines is resisted.

Although the forms of rake disclosed herein represent practical and the at present preferred embodiments of my invention, it will be understood that various changes may be made in the construction and relative arrangement of the parts without departing from the invention as defined in the claims.

I claim:

1. In a rake, the combination of a cross frame member comprising a plate having its front and rear edge portions return-bent inwardly, the front edge being provided at its bend with a plurality of spaced openings; a plurality of tines passing respectively through said openings and having their rear end portions disposed between the return-bent rear edge portion of said plate and the plate proper; and an interlocking connection between each tine and said frame member intermediate the front and rear edge portions of the latter for resisting longitudinal movement of said tines.

2. In a rake, the combination of a cross frame member comprising a plate which is nearly flat, being deformed only slightly in cross section and having its front and rear edge portions return-bent inwardly, the front edge being provided at its bend with a plurality of spaced openings; and a plurality of separate individually removable tines passing respectively through said openings and having their rear end portions disposed between the return-bent rear edge portion of said plate and the plate proper, the portions of said tines intervening between said return-bent frame edges conforming to the deformation of said frame member.

3. In a rake, the combination of a cross frame member comprising a plate formed with a struck-up portion providing a groove extending along said member between its front and rear edges and having its front and rear edge portions return-bent inwardly, the front edge being provided at its bend with a plurality of spaced openings; and a plurality of tines passing respectively through said openings and having their rear end portions disposed between the return-bent rear edge portion of said plate and the plate proper, the portions of said tines intervening between said return-bent frame edges being struck up to provide ridges adapted to fit in said groove for resisting longitudinal movement of said tines.

4. In a rake, the combination of a cross frame member having its front edge portion bent over and provided with a plurality of tine-receiving openings and having its rear edge portion return-bent inwardly and facing towards said front edge portion, the frame member being deformed in transverse cross section; and a plurality of tines passing through said openings and having their rear ends disposed between the return-bent rear edge portion of said frame member and the frame member proper, the tines being deformed in longitudinal cross section correspondingly to the deformation in the frame member whereby to resist displacement of the tines from the frame.

5. In a rake, the combination of a cross frame member formed with a groove extending along said member between its front and rear edges and having its front edge bent over and provided with a plurality of tine-receiving openings, and having its rear edge portion return-bent inwardly; and a plurality of tines extending through said openings and having their rear end portions disposed between the return-bent rear edge portion and the frame member proper, the portions of the tines intervening between said front and rear edge portions being provided with projecting portions fitting in the groove in said frame member for resisting longitudinal movement of said tines.

6. In a rake, the combination of a cross frame member having its front edge portion bent over and provided with a plurality of tine-receiving openings and having its rear edge portion return-bent inwardly and facing towards said front edge portion, the frame member being curved in transverse cross section; and a plurality of tines passing through said openings and having their rear ends disposed between the return-bent rear edge portion of said frame member and the frame member proper, the tines being curved in longitudinal cross section correspondingly to the curvature in the frame member whereby to resist displacement of the tines from the frame.

7. In a rake, the combination of a cross frame member formed with a groove extending along said member and having its front edge bent over and provided with a plurality of tine-receiving openings, and having its rear edge portion return-bent inwardly; and a plurality of tines extending through said openings and having their rear end portions disposed between the return-bent rear edge portion and the frame member proper, the tines being provided with projecting portions fitting in the groove in said frame member for resisting longitudinal movement of said tines.

8. In a rake the combination of a cross frame member comprising a plate having its front edge portion return-bent inwardly, and its rear edge portion return-bent inwardly and facing towards said front edge portion, the front edge being provided at its bend with a plurality of spaced openings; and a plurality of tines passing through said openings, and having their rear end portions disposed under the return-bent rear edge portion of said plate, said tines being restrained from endwise removal by deformations of portions of said tines lying between the return-bent edges of the plate.

WENCESLAUS G. ROCQUIN.